United States Patent [19]

Linden

[11] Patent Number: 4,924,818
[45] Date of Patent: May 15, 1990

[54] INSULATED ENGINE

[76] Inventor: Craig L. Linden, 1335 Midway Dr., Alpine, Calif. 92001

[21] Appl. No.: 177,532

[22] Filed: Apr. 4, 1988

Related U.S. Application Data

[63] Continuation-in-part of Ser. No. 657,205, Oct. 3, 1984, Pat. No. 4,657,290, and a continuation-in-part of Ser. No. 933,738, Nov. 21, 1986, Pat. No. 4,736,111.

[51] Int. Cl.⁵ .............................................. F01P 11/02
[52] U.S. Cl. .................................... 123/41.14; 123/2; 123/198 E
[58] Field of Search ............... 123/198 E, 41.3, 2, 123/3, 41.14; 237/12.3 C; 62/323.1, 238.1, 238.3

[56] References Cited

U.S. PATENT DOCUMENTS

| | | | |
|---|---|---|---|
| 1,077,041 | 10/1913 | Collier | 237/12.1 X |
| 2,076,382 | 4/1937 | Minton | 290/2 |
| 2,273,502 | 2/1942 | Couse | 237/12.1 X |
| 3,534,828 | 10/1970 | Leonard et al. | 123/198 E |
| 3,648,643 | 3/1972 | Murray | 114/253 |
| 3,723,027 | 3/1973 | Montelius | 60/469 |
| 3,805,082 | 4/1974 | Murray | 123/1 X |
| 3,822,740 | 7/1974 | Hackett | 237/12.1 |
| 3,858,802 | 1/1975 | Stobart | 237/12.1 |
| 3,944,837 | 3/1976 | Meyers et al. | 290/2 X |
| 4,065,055 | 12/1977 | De Cosimo | 237/12.1 |
| 4,150,300 | 4/1979 | Van Winkle | 237/12.1 X |
| 4,226,214 | 10/1980 | Palazetti | 123/198 E X |
| 4,262,209 | 4/1981 | Berner | 290/2 X |
| 4,264,826 | 4/1981 | Ullmann | 290/2 |
| 4,291,834 | 9/1981 | Palazetti et al. | 237/12.1 |
| 4,330,084 | 5/1982 | Buchner et al. | 237/12.1 |
| 4,384,673 | 5/1983 | Carson | 237/12.1 |
| 4,385,725 | 5/1983 | Pischlinger | 237/12.1 |
| 4,495,901 | 1/1985 | Nannini et al. | 123/198 E X |
| 4,503,337 | 3/1985 | Hafner et al. | 290/1 A X |
| 4,510,756 | 4/1985 | Hise et al. | 237/12.1 X |
| 4,527,071 | 7/1985 | Ausiello | 290/2 X |
| 4,548,164 | 10/1985 | Ylonen et al. | 123/198 E X |
| 4,657,290 | 4/1987 | Linden | 290/2 |
| 4,735,061 | 4/1988 | Hsieh | 62/323.1 X |

FOREIGN PATENT DOCUMENTS

| | | | |
|---|---|---|---|
| 3137397 | 4/1983 | Fed. Rep. of Germany | 123/198 E |
| 3239654 | 5/1984 | Fed. Rep. of Germany | |
| 200020 | 11/1984 | Japan | 123/198 E |

OTHER PUBLICATIONS

Cogen Intelligence Monthly, vol. 5, No. 4, Oct. 1986, Cogenic, Suite 331, Box 5000, Delmar, CA 92014.

*Primary Examiner*—Noah P. Kamen
*Attorney, Agent, or Firm*—Fulwider, Patton, Lee & Utecht

[57] ABSTRACT

An insulated prime mover or engine in which a radiant heat retardant material surrounds the engine or engine components throughout normal service life and prevents cooling through radiation. The heat otherwise radiated is absorbed by the coolant for extraction to do useful work. Using insulation makes it possible to maintain the engine near operating temperatures for extended periods of time after engine shut down.

4 Claims, 1 Drawing Sheet

INSULATED ENGINE

CROSS REFERENCES TO RELATED APPLICATION

This application is a continuation-in-part of U.S. patent application Ser. No. 657,205, filed Oct. 3, 1984 and entitled "Co-generation Plant Module System", now U.S. Pat. No. 4,657,290; and U.S. patent application Ser. No. 933,738, filed Nov. 21, 1986, and entitled "Cogeneration System", now U.S. Pat. No. 4,736,111.

BACKGROUND OF THE INVENTION

The present invention relates to a thermally insulated prime mover or engine, and more particularly to a thermally insulated engine in which radiant heat from the engine block is captured.

DESCRIPTION OF THE PRIOR ART

The overall efficiency of most prime movers such as internal combustion engines that convert combustible fuel into mechanical power is relatively poor, being in the order of 30 percent. This is attributable in large part to wasted heat carried away by the engine exhaust and cooling systems, and to heat lost by radiation from external engine surfaces. However, in cogeneration systems such as those disclosed in my U.S. Pat. No. 4,657,290, and my copending U.S. patent application Ser. No. 933,738, otherwise wasted heat is captured and utilized to provide hot water or air conditioning for the facility that uses the energy provided by the engine-generator set. The overall efficiency of such systems is often as high as 95 percent or better.

Such cogeneration systems employ a water cooled engine surrounded by thermal insulating material to substantially prevent loss of radiant heat energy. The trapped heat energy instead passes into the engine coolant circulating through the engine cooling jacket. The heated coolant is then routed through suitable means such as a heat exchanger to do useful work.

Insofar as applicant is aware, the foregoing insulation technique has not been tried in connection with prime movers other than those used in applicant's cogeneration systems. Heretofore, it has been conventional design philosophy to radiate as much heat as possible from engine surfaces, including radiation from the usual depending oil pan. This has a number of disadvantages. On shut down the engine parts quickly return to ambient temperature and an inordinate amount of time is required on engine start up to reattain proper operating temperatures. Abrupt temperature changes cause wear and reduce the service life of engine components. On each cold start the engine parts have not yet expanded to their proper tolerances, and the viscosity of the oil is not at an optimum value. This causes excessive wear on engine parts, batteries, and starters. Recent studies have also established that more pollutants are given off on cold starts, and that successive cold starts break down lubricating oil into harmful acid and sludge components. There are special systems in the prior art to constantly heat engines to keep them warm and ready to start easily when needed. Some people even throw a blanket over their automobile engine to prevent extreme cool-down during winter conditions.

Aside from considerations of waste, high heat loss is a further problem in military applications because excess heat produces a so-called heat signature easily detected and tracked by infrared sensing devices. Any engine powered vehicle, target drone engine or large stationary engine is vulnerable to long distance detection and tracking where the heat loss is sufficiently great.

In summary, none of the prior art teachings appear to recognize the importance of preventing radiation heat loss in engines.

SUMMARY OF THE INVENTION

Contrary to conventional thinking that heat radiation is necessary to achieve proper engine operation, the present invention teaches just the opposite. As previously indicated, in my patent applications relating to cogeneration systems, thermal engine insulation causes otherwise wasted heat to pass into the engine coolant from which it can be extracted to produce useful work. High efficiencies are achieved by capturing a high proportion of this heat for heating and cooling needs, while also improving the overall mechanical efficiency of the prime mover or engine.

The present invention is a refinement of that concept in that any prime mover can be made to operate more efficiently by thermally insulating it against excessive radiant heat energy loss. Many applications can be envisioned. For example, the heat in the coolant system of a truck hauling a refrigerated trailer could be used to operate the refrigeration system. Waste prime mover heat can also be used to operate high efficiency auxiliary engines that run on heat energy, or it can be stored in thermal energy storage systems, such as systems which change the phase of materials such as eutectic salts. Such materials absorb heat and change phase from a solid to a liquid without changing temperature. When the process is reversed, the liquid gives up its heat as it changes back to a solid and this heat can be used for any useful purpose when needed.

By thermally insulating a prime mover it is possible to capture prime mover heat that would otherwise be lost due to radiation from the various portions of the prime mover. Equally important, on shut down such an insulated prime mover could be maintained at near operating temperatures for extended periods of time, ready for instant efficient starts.

According to the present invention, thermal insulating means are provided which surround the prime mover during normal operation and service, and substantially prevent loss of excess heat during operation and after shut down. The thermal insulating means acts as a thermal barrier to cause the otherwise radiated heat to be absorbed by the engine. The thermal insulating means can take the form of bulk insulation, encapsulation, or reflective insulation, the bulk insulation breaking up the heat-flow path by the interposition of air spaces, while reflective insulations are characterized by high reflectivity of heat radiation.

With proper thermal insulation the engine can be maintained at close to proper operating temperatures for significant periods after engine shut down, thus preventing oil breakdown, acid formation and sludge condensation in the engine, as well as cold start pollution and thermal shock to engine components. In addition, the insulation provides acoustic attenuation and substantially eliminates the existence of an infrared "heat signature" so that the insulated engine is difficult to detect by sound or heat sensors in military applications. Further, the insulation can be fabricated to include materials capable of reducing or preventing spurious radiation through the insulation, particularly including radiation from external radiation sources which might otherwise damage the prime mover and its electronic subassemblies.

Other aspects and advantages of the present invention will become apparent from the following more detailed description taken in conjunction with the accompanying drawings.

DESCRIPTION OF THE PREFERRED EMBODIMENTS

Figure 1:
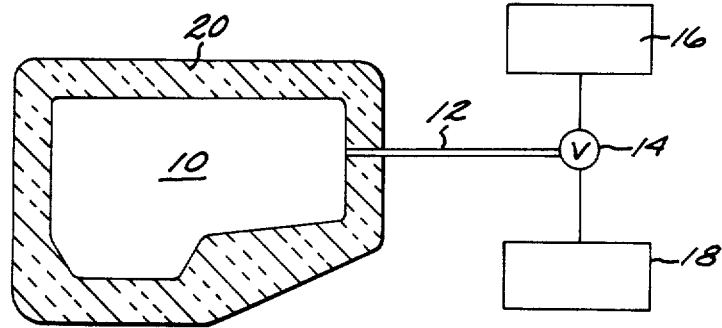
FIG. 1 is a schematic longitudinal cross sectional view of a prime mover such as an engine, thermally insulated according to the present invention, the engine being diagrammatically shown in association with a heat exchanger and a heat storage system.

Referring now to FIG. 1, a prime mover or engine is illustrated in the form of an internal combustion engine 10 of the type which converts a working fluid or combustible fuel into mechanical power and heat energy. As is well known, the mechanical power is typically used to rotate a drive shaft or the like (not shown). The heat energy developed passes into the exhaust coming from the engine exhaust system (not shown), and also into the engine coolant which is circulated through the engine cooling jacket (not shown). Details of such exhaust systems and cooling systems are well known in the art and are therefore omitted for brevity and because they form no part of the invention.

The phantom line 12 is used to designate generally the paths of the coolant as it circulates between the engine cooling jacket and external components under the control of suitable valve means 14. The present invention may also be used in association with prime movers of the type which utilizes materials such as ceramics for high temperature performance without the use of conventional coolants. The air fuel mixture passing through such an engine constitutes the coolant. In that case a suitable heat exchanger would be associated with the exhaust to extract heat for useful work.

The valve means 14 may be manually or automatically operated at a predetermined temperature to cause the coolant to flow either to a heat exchanger 16, which may be an oversize radiator of conventional construction, or to a heat storage means such as the means 18, which incorporates a phase change material.

The heat exchanger 16 and heat storage means 18 are designated diagrammatically because they may take any of a variety of forms for dissipating heat, for using heat to do useful work, or for storing heat. For example, the heat exchanger 16 could be a vehicle refrigeration system, or an auxiliary heated fluid operated engine, etc., or a usual radiator if it is not desired to apply the heated coolant to any useful purpose. Likewise, the phase change heat storage material mentioned as one form of heat storage means 18 is also merely exemplary. There is developing technology in other fields, particularly in the solar energy field, in which heated liquids are stored for a variety of end uses. In this regard, it is conceivable that advances in such technology will make it possible for an automobile user to store energy during normal use of the automobile, and "plug in" the heat storage means 18 at home to augment a residential heating or air conditioning system which operates on heated fluid. It is also conceivable that heated phase change material could be deposited or exchanged at some central facility designed to accumulate such heat units for use in providing heating or cooling for nearby buildings. Such end uses do not form a part of the invention and are mentioned only to show that the "waste" heat of engines can be put to useful purposes.

Aside from the heat energy conservation, the insulated engine 10 is characterized by a number of important operating advantages. In the embodiment of FIG. 1, the engine is engaged and surrounded by a blanket, shell or encapsulating layer 20 of any suitable bulk insulating material. The layer 20 is "permanent" in the sense that it stays in place at all times during the normal operating or service life of the engine to substantially prevent the loss of radiant heat energy from the exterior surfaces of the engine. However, it can be removed for maintenance or the like. In some applications it may be sufficient to encapsulate only the lower, oil pan portion of the engine. This provides important benefits in maintaining the oil near operating temperatures on engine shut down.

The layer 20 causes heat energy to be absorbed by the particular coolant or cooling fluid which passes through the engine. It is preferably in composite form comprising woven ceramic inner and outer layers and an intermediate layer (not shown) of suitable bulk insulation. If the layer is in the form of a shell it may be made of any suitable molded high temperature rated plastic foam material. The thickness and type of material in the layer 20 may vary as required by the particular application, and the materials mentioned are given only by way of example. As previously indicated, a layer of suitable radiation reflective material can also be incorporated if desired. This reduces or prevents radiation from the engine to eliminate any "heat signature", and it also would prevent, if it were a layer of lead foil or the like, electromagnetic wave penetration of the insulation by nuclear weapon detonation.

In some instances it may be desirable to modify or relocate the moving components of the engine, such as when it is intended that a continuous body of insulation surround the engine. This would necessitate placement of the cooling fan (not shown) externally of the layer 20, and the operating shaft of the fan would then extend through the layer. This is a matter of choice, the main consideration being to surround as much of the exterior engine surfaces as possible to substantially eliminate heat loss through radiation. On occasion, sufficient benefits may be realized by pursuing a less comprehensive insulation arrangement, such as limiting the insulation covering to the oil pan portion of the engine.

Figure 2:
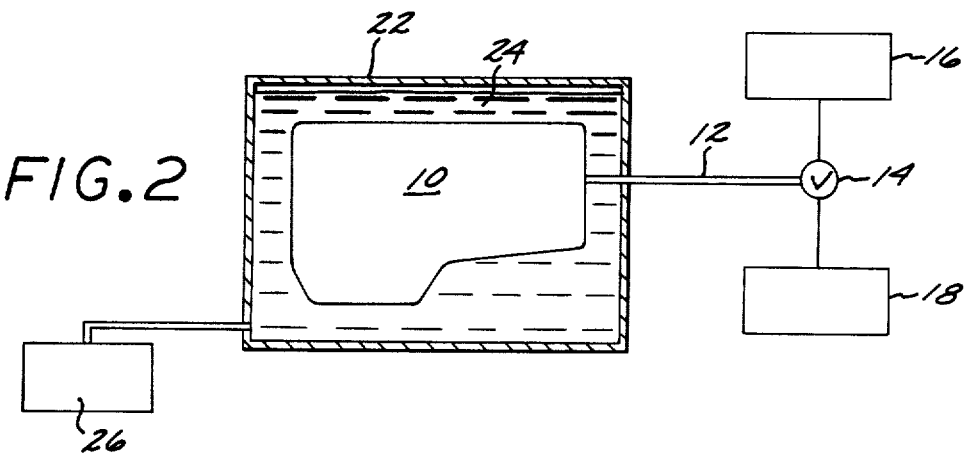
FIG. 2 is a view similar to FIG. 1, but illustrating the thermal insulation as a body of fluid such as liquid.

FIG. 2 illustrates an embodiment substantially identical to that of FIG. 1 except that the thermal insulating means comprises a containment means or housing 22, and also a contained fluid 24 such as an inert gas, a vacuum, or liquid such as water which completely envelops the engine. The housing 22 may be made of walls which themselves include insulation.

If liquid is employed, the engine is suitably sealed to prevent intrusion of the liquid into the engine interior although, if desired, the liquid could be oil, in which case the engine would benefit from oil intrusion.

In the embodiment of FIG. 2 engine heat passes into the body of water 24, and the heated water is then drawn by suitable pumps or the like (not shown) into a heat exchanger or heat storage means 26, much like the heat exchanger 16 and heat storage means 18 discussed above.

Figure 3:
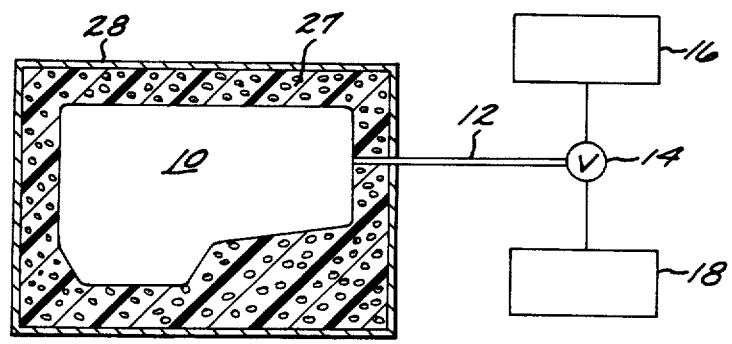
FIG. 3 is a view similar to FIG. 1, but illustrating the thermal insulation as particulate matter.

FIG. 3 is an embodiment substantially similar to that of FIG. 2 except that the insulating material is loose fill or particulate matter 26 such as expanded vermiculite, mineral wool, vegetable fibers, organic papers, expanded perlite, cellular glass or the like, enclosed within a containment means or housing 28. The fluent particles or granules arrange themselves closely adjacent to the engine in closely conforming relation.

Figure 4:
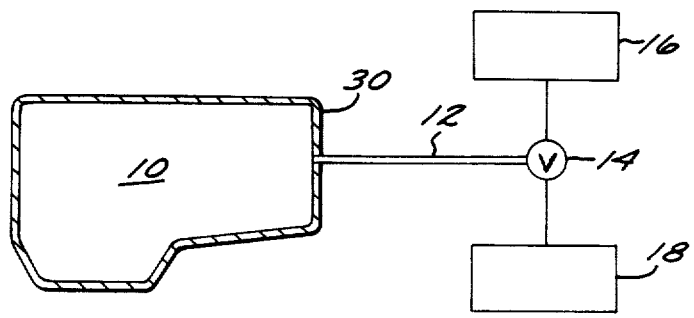
FIG. 4 is a view similar to FIG. 1, but illustrating the thermal insulation as a reflective paint coating, or a low thermal conductivity ceramic layer.

FIG. 4 is an embodiment substantially identical to that of FIG. 1, except that the insulating means is a coating of heat reflective paint or heat insulating ceramic 30.

From the foregoing it will be apparent that the thermal insulating means may take any of a variety of forms, it being important mainly that the thermal insulation be capable of maintaining the engine at or near operating temperatures for an extended period of time. In some instances insulation of the oil pan alone will be sufficient to enjoy significant advantages in engine operation and efficiency.

The system of the invention reduces or avoids thermal extremes in engine operation, promotes better heat distribution, and, as a consequence, greatly improves the longevity and efficiency of the engine. Moreover, the production of pollutants and the formation of sludge and acids in the lubricating oil is also greatly reduced.

Various modifications and changes may be made with regard to the foregoing detailed description without departing from the spirit of the invention.

I claim:

1. In combination with a prime mover whose operation is characterized by the production of mechanical power and heat energy, and further characterized by a cooling system for circulating a cooling medium through the prime mover to carry off heat energy, the improvement comprising:

thermal insulating means surrounding the prime mover during service for substantially preventing radiation of heat energy, for causing otherwise radiated heat energy to be absorbed by the cooling medium, on shut down of the prime mover, for reducing cooling of the prime mover below operating temperatures;

a heat exchanger;

heat storage means; and conduit means coupled to the cooling system, the heat exchanger, and the heat storage means, and including valve means for selectively directing the cooling medium to one of the heat exchanger and the heat storage means.

2. The improvement of claim 1 wherein the heat storage means comprises phase change material adapted to undergo a phase change for absorbing heat.

3. In combination with a prime mover whose operation is characterized by the production of mechanical power and heat energy, and further characterized by a cooling system for circulating a cooling medium through the prime mover to carry off heat energy, the improvement comprising:

thermal insulating means surrounding the prime mover during service and substantially preventing radiation of heat energy, the thermal insulating means acting as a thermal barrier to cause otherwise radiated heat energy to be absorbed by the cooling medium;

a heat exchanger comprising an auxiliary heated fluid operated engine;

heat storage means; and conduit means coupled to the cooling system, the heat exchanger, and the heat storage means, and including valve means for selectively directing the cooling medium to one of the heat exchanger and the heat storage means.

4. In combination with a prime mover whose operation is characterized by the production of mechanical power and heat energy, and further characterized by a cooling system for circulating a cooling medium through the prime move to carry off heat energy, the improvement comprising:

thermal insulating means surrounding the prime mover during service and substantially preventing radiation of heat energy, the thermal insulating means acting as a thermal barrier to cause otherwise radiated heat energy to be absorbed by the cooling medium;

a heat exchanger comprising an absorption chiller of a vehicle cooling apparatus;

heat storage means; and conduit means coupled to the cooling system, the heat exchanger, and the heat storage means, and including value means for selectively directing the cooling medium to one of the heat exchanger and the heat storage means.

* * * * *